2,772,983
ORGANIC PIGMENT PRODUCTION

Godfrey Grimm, Short Hills, and Alfred A. Brizzolara, Belleville, N. J., assignors to E. I. du Pont de Nemours & Company, Wilmington, Del., a corporation of Delaware No Drawing. Application October 20, 1952,
Serial No. 315,854
5 Claims. (Cl. 106—289)

This invention relates to the production of organic pigments and more particularly to the preparation of stable Benzidine Yellow pigments exhibiting markedly improved properties.

The term "Benzidine Yellow" applies in a generic way to a group of pigment dyestuffs obtained by coupling tetrazotized 3,3' dichloro benzidine with aceto acetanilide or derivatives thereof. These colors are described in German Patent 251,479 and have become valuable articles of commerce because of high tinctorial strength and relatively good lightfastness accompanying desirable color values. The parent compound coupled with aceto acetanilide has proved especially valuable and it is with this compound that the present invention is principally concerned.

Although Benzidine Yellow pigments have been used widely in commercial applications, they suffer from certain defects which detract much from their economic value and reduce their usefulness to a marked degree.

When the azo coupling is carried out under optimum conditions and the color paste is transferred directly to an oily vehicle, such as lithographic varnish, the pigment usually exhibits a remarkably high tinctorial strength. However, this is accompanied by a very dark color in full shade masstone which is also quite transparent and the ink has an undesirably heavy body for a given pigmentation.

If, instead of transferring directly to the oil, the pigment is dried out and then incorporated in a vehicle, a marked change is observed. The pigment becomes light and opaque in full shade and very much weaker in tint. There is also a marked change in the rheological properties, the ink being much thinner. Some of these changes are desirable but the loss in tinctorial strength is highly undesirable. Moreover, this loss in strength appears to be variable in degree and there is usually a continual loss in strength for some time after the pigment is dried.

The problem of stabilizing Benzidine Yellow pigments has been actively studied for some time and various expedients have been proposed in attempts at overcoming some of the confronting problems and difficulties. However, the ideal solution to the problem has been lacking. For instance, to incorporate certain surface-active agents, usually anionic in character, in the coupling reaction stabilizes the pigment to some degree against the loss in strength on drying, but such pigments disadvantageously retain the transparency of masstone and the poor rheological properties of the flushed ink. Likewise, the incorporation of substantial amounts of metallic rosinates in accordance with the disclosure of U. S. Reissue 18,590, though providing substantially stable pigments which are stronger than the usual dried toners even though they contain 20%–30% of the inert metallic rosinate, affords products still exhibiting undesired dark transparent masstones and very heavy ink.

It is among the objects of this invention to overcome the above and other disadvantages attending prior Benzidine Yellow pigment manufacture and to provide novel and effective methods for attaining such objects. The invention has as its principal object the preparation of stable Benzidine Yellow pigments exhibiting high tinctorial strength accompanied by the desirable light, opaque masstone when incorporated in a vehicle such as lithographic varnish and giving an ink of desirably low viscosity. Other objects and advantages of the invention will be apparent from the ensuing description.

These and other objects are accomplished in this invention which comprises incorporating into the pigment a combination of a metallic rosinate and a surface-active agent comprising an alkyl ester of alkali metal (sodium) sulfo succinic acid. Particularly useful for this purpose is the dioctyl ester of sodium sulfo succinic acid.

In a more specific and preferred embodiment, the invention comprises coupling diazotized dichlorobenzidine with aceto acetanilide under slightly acid conditions, neutralizing the resulting slurry with an alkali such as sodium hydroxide, incorporating a solution of the dioctyl ester of sodium sulfo succinate in the neutralized slurry, followed by a solution of sodium rosinate, precipitating the rosinate with a solution of a metallic salt such as calcium or, preferably, zinc, and then isolating the pigment by conventional filtration, drying and pulverizing.

To a clearer understanding of the invention, the following specific example is given. This is merely illustrative and is not to be construed as in limitation of the invention:

Example 253 gm. (1 mol) of 3-3' dichlorbenzidine is stirred to a smooth slurry in a solution of 179 gm. HCl (100%) in 1750 cc. water. This slurry is cooled with ice to 0° C. and adjusted to a volume of about 5400 cc. There is then added in 3–4 min. a solution of 155 gm. sodium nitrite in 620 cc. water and the mixture is stirred for about 15 min. at 0° C. to complete tetrazotization. If desired, the solution may be clarified by stirring with activated charcoal and filtercel and then filtering. Excess nitrite may be removed by the addition of a dilute solution of sulfamic acid.

In a separate container 392 gm. (2.22 mols) of aceto acetanilide is dissolved in a solution of 256 gm. sodium hydroxide in about 12,000 cc. of water at room temperature. The intermediate is then precipitated in a finely divided form by adding 392 gm. of acetic acid (100%) to give a pH of about 5.8. The slurry is cooled at 0° C. and the volume adjusted to about 20,000 cc.

The tetrazo solution is then introduced into the coupling bath beneath the surface over a period of about 60 min. with the temperature maintained at 0° C. At the end of the coupling the pH is 3.8–4.0 and, after stirring 30 min., the slurry is neutralized to a pH of 8.0–8.5 by adding a solution of about 215 gm. NaOH in 2,000 cc. water. 32 gm. of dioctyl ester of sodium sulfo succinic acid dissolved in 1500 cc. water is then added, followed by a solution prepared by adding 97 gm. K Wood Rosin to a solution of 12.5 gm. sodium hydroxide in 1000 cc. water and boiling to solution.

At this point the slurry is heated slowly (40–50 min.) to 60° C. and stirred at that temperature for about 10 min. A solution of 64 gm. zinc sulfate ($ZnSO_4 \cdot 7H_2O$) in 250 cc. water is then added slowly and the mixture stirred 15 min. The pigment is isolated by filtration, washed free of soluble salts, and dried at 60° C. After pulverizing the dry pigment, there is obtained about 785 gm. of a stable yellow powder exhibiting high strength with a light, opaque masstone and yielding printing inks of a desirable low viscosity.

If the alkyl ester of sodium sulfo succinic acid is omitted from this procedure, the pigment will exhibit a dark, transparent masstone and will yield very heavy inks. If both the surface-active agent and rosinate are omitted, the pigment loses much strength on drying and is generally unstable.

While the invention has been described in its application to certain specific embodiments, it is not to be construed as restricted thereto. As already noted, it is particularly applicable to the stabilizing of Benzidine Yellow disazo dyestuff pigments of the type described in German Patent 251,479, and especially those resulting from the combination of tetrazotized o-dichlorobenzidine or tetrachlorbenzidine with acetoacetic arylides. Similarly, the type and amount of metal rosinate and surface-active agent can be varied within limits. Thus, use is contemplated of the metallic rosinate treating agents disclosed in U. S. Reissue Patent 18,590. These comprise the rosinates or metal salts of the organic acids in rosin or tall oil and related compounds. Of these, zinc rosinate is preferred for use but alkaline earth metal rosinates such as those of magnesium, calcium, barium and strontium, and generally rosinates prepared from a water-soluble salt of a metal from the second group of the periodic table between atomic numbers 12 and 56, inclusive, are employable. The optimum amount of metallic rosinate used ranges from between about 20% and 30% of the final weight of the pigment. The addition of a small amount of metallic rosinate to the Benzidine Yellow pigment prior to drying results in a stronger pigment than when no rosinate is present in spite of the dilution by a colorless material. As the rosinate is increased, the strength increases up to about 20% rosinate. Between 20% and 30% rosinate there is little difference in the resulting color strength in spite of the increasing dilution, but beyond 30% there is a loss in strength more or less proportional to the increase in rosinate. Thus, for optimum tinctorial strength a range of 20% to 30% of metallic rosinate is preferred. However, as the rosinate is increased to obtain superior strength, the undesirable dark, transparent masstone also becomes more pronounced, accompanied by increasingly heavy inks.

When one of the preferred surface-active agents is employed in conjunction with the rosinate, the strength relationships in comparison to the amount of rosinate still hold but the undesirable properties are offset and the desirable lightness and opacity of masstone are introduced, accompanied by improvement in the rheological properties of the inks, in proportion to the amount of surface-active agent added. At the level of 20-30% rosinate for optimum strength, up to about 20% of the preferred dioctyl ester of sodium sulfo succinic acid (based on toner content) can be used to give the desired combination of properties. Although within the scope of the invention, this amount of surface-active agent introduces some economic disadvantages; however, a compromise which retains the advantages of the invention without a serious economic penalty is available. Thus, in the range of 10-15% zinc rosinate (the foregoing example uses about 14.5%) the major portion of the strength advantage is realized and markedly less surface-active agent is required to achieve the other desirable properties. In the example given, about 5% of agent is resorted to.

In general, the invention contemplates the use in a benzidine yellow of about 10% to about 30% of a metallic rosinate and about 5% to about 20% of surface-active agent, particularly dialkyl ester of sodium sulfo-succinate, based, in each case, on the weight of the toner present.

Although the preferred surface-active agent, the dioctyl ester of sodium sulfo-succinate, is the best known and most readily available of the employable series of dialkyl esters of sodium sulfo-succinate, other alkyl esters of alkali metal (sodium, potassium, lithium) sulfo-succinic acid, including particularly the diethyl ester, the di-isopropyl ester, the dibutyl ester, and the di-hexyl ester of sodium sulfo-succinic acid are also effective for use and contemplated as employable in the invention. Of these esters, those having alkyl groups in which the carbon chains range from 1–8 or 10 carbon atoms are especially preferred.

As pointed out above, the rosinate alone gives high strength with dark, transparent masstones and heavy inks. Likewise, when surface-active agents have promoted stability, they have given similar properties, and it was entirely unexpected to find that the combination of agents gave the high strength accompanied by the light, opaque masstones and low viscosity inks.

We claim as our invention:

1. A method of stabilizing Benzidine Yellow against loss of strength on aging while retaining the ability to confer on inks and coating compositions made therefrom substantially the same opacity and the same rheological properties as freshly prepared, untreated Benzidine Yellow which comprises precipitating on the freshly prepared pigment in aqueous suspension from about 10–30%, based on the weight of said pigment, of a metallic rosinate of a second group metal between atomic numbers 12 and 56 in the presence of from about 5–20%, based on the pigment, of a dialkyl ester of sodium sulfo succinate containing from 1–8 carbon atoms in each alkyl radical.

2. A method of stabilizing Benzidine Yellow against loss of strength on aging while retaining the ability to confer on inks and coating compositions made therefrom substantially the same opacity and the same rheological properties as freshly prepared, untreated Benzidine Yellow which comprises precipitating on said pigment while in aqueous suspension and in the presence of from 5–20% of a dialkyl ester of sodium sulfo succinic acid containing from 1–8 carbon atoms in each alkyl radical, from about 20–30%, based on the final weight of said pigment, of zinc rosinate.

3. A method of stabilizing Benzidine Yellow against loss of strength on aging while retaining the ability to confer on inks and coating compositions made therefrom substantially the same opacity and the same rheological properties as freshly prepared, untreated Benzidene Yellow which comprises precipitating on said pigment while in aqueous suspension, and in the presence of from 5–20% of the dioctyl ester of sodium sulfo succinic acid, from about 20–30%, based on the final weight of said pigment, of zinc rosinate.

4. A method of stabilizing Benzidine Yellow against loss of strength on aging while retaining the ability to confer on inks and coating compositions made therefrom substantially the same opacity and the same rheological properties as freshly prepared, untreated Benzidine Yellow which comprises precipitating on said pigment while in aqueous suspension, and in the presence of from 5–20% of the dibutyl ester of sodium sulfo succinic acid, from about 20–30%, based on the final weight of said pigment, of zinc rosinate.

5. A method of stabilizing Benzidine Yellow against loss of strength on aging while retaining the ability to confer on inks and coating compositions made therefrom substantially the same opacity and the same rheological properties as freshly prepared untreated Benzidine Yellow which comprises precipitating on the freshly prepared pigment in aqueous suspension from about 10–30% based on the weight of said pigment of a metallic rosinate of a second group metal between atomic numbers 12 and 56 in the presence of a dialkyl ester of an alkali metal sulfo succinate containing from 1–8 carbon atoms in each alkyl radical.

References Cited in the file of this patent

UNITED STATES PATENTS

| Re. 18,590 | Allen et al. | Sept. 6, 1932 |
| 2,168,888 | Siegel | Aug. 8, 1939 |
| 2,205,950 | Flett | June 25, 1940 |
| 2,296,383 | Gans | Sept. 22, 1942 |
| 2,354,463 | Kienle et al. | July 25, 1944 |
| 2,362,964 | Affleck | Nov. 21, 1944 |
| 2,377,172 | Murphy | May 29, 1945 |